United States Patent Office 2,713,542
Patented July 19, 1955

2,713,542

PROCESS FOR TREATING CEREAL PRODUCTS AND PRODUCTS OBTAINED THEREFROM

Umberto Bellini D'Atri, Van Horn, Tex.

No Drawing. Application July 25, 1951,
Serial No. 238,586

12 Claims. (Cl. 99—80)

This invention relates to a method and process for treating cereals and, more particularly, to a method and process for treating rice and rice products and the products obtained from this process.

Although the present invention is applicable to cereal products generally, rice will be used for the purposes of illustration in the specification and the claims. Rice products heretofore produced often become rancid upon standing or storage and hence become unusable for their intended purpose. In addition, the processes and methods used heretofore, in cleaning the rice produce only about 50 percent of polished whole kernel product from the raw rice. The remaining portion of the rough rice is broken or powdered during the process steps, the broken or powdered product being less desirable than the whole kernel or unbroken product.

Accordingly, it is an important object of this invention to provide an improved process for treating cereal products and particularly rice; more specifically, it is an important object of the present invention to produce a greater proportion of the more desirable product comprising unbroken rice kernels.

Another object of the invention is to provide a process, the products of which can be preserved for long periods of time without deterioration and without the development of rancidity.

A further object of the invention is to provide a process which will produce a product having a pleasing color and appearance, yet which retains a greater percentage of the original food value including vitamins of the original rough rice as contrasted with the present process.

Yet another object of the invention is to provide a process which materially shortens the process time, which requires less labor and equipment, and which thereby reduces the cost of the product.

A still further object is to provide new and valuable products which result from the application of the present process to cereals such as rice.

It has now been found that the above and other objects are accomplished by the use of the following process. Rough rice, loonzain, brown rice, rice from the first break called simply "first break," milled rice, or polished rice are subjected to a basic solution and an acid solution. Preferably, the rice or rice product is treated first with the basic solution and then with the acid solution, but in certain instances treatment may be made with the acid solution followed by treatment with the basic solution. The resulting product is substantially free from materials which tend to make the product rancid upon standing and, therefore, have long storage lives and resist the formation of rancidity. The product derived by treatment with the basic and acidic solutions is then subjected to the usual additional processing steps or may be subjected to the further processing steps of the present invention or a combination of these steps.

If rough rice is the starting product by this process, the treated rice is then hulled, both the hull and the kernel being retained for further processing. The hulled rice, loonzain, or brown rice whether produced as in the preceding sentence or as produced by starting with loonzain as the original starting material, is then subjected to the first break in which a portion of the bran coating is removed together with the germ or embryo. This product in the first break is subjected to an oxidizing solution which whitens the product and gives it a more pleasing appearance. The resultant product is even whiter than products produced heretofore and yet retains a large fraction of the bran including the vitamins and minerals. This product can be sold in the same manner as polished rice that has been subjected to a plurality of breaks since its appearance is equal to or better than the appearance of polished rice made heretofore. This oxidizing step can be applied to other rice products including polished rice and rice products which have not been subjected to the basic and acidic solutions as set forth above.

The starting material for the present process can be rough rice, loonzain, brown rice, the product from the first break or subsequent breaks, polished rice, or any other product of rough rice. It is preferred to first remove the materials which tend to turn the product rancid upon storage and standing. This is accomplished by treating the rice product with a basic solution, preferably at an elevated temperature and under vacuum. A preferred solvent is water and suitable bases are hydroxides of the alkaline earth metals such as sodium hydroxide and potassium hydroxide, or ammonium hydroxide. The preferred base is sodium hydroxide. When sodium hydroxide is the base utilized, the concentration of the solution is from 0.012 percent up to about 9 percent or more by weight of the base dissolved in water. Equivalent amounts of the other bases are utilized when other bases are used. Preferably a mixture of sodium hydroxide and sodium carbonate is used for purposes set forth hereafter. When the mixture of sodium hydroxide and sodium carbonate is used, about two parts of sodium hydroxide by weight are used to one part of sodium carbonate by weight. When the alkaline treatment is carried out in vacuum, the vacuum used may be from about 10 inches to about 27 inches. When 10 inches of vacuum are used, the temperature should be about 175–180° Fahrenheit whereas when 27 inches of vacuum are used, the temperature should be up to about 150–158° Fahrenheit. The time required is about 10 minutes for completing the reaction under vacuum.

The purpose of the treatment with alkaline solution is to penetrate the hulls, germ, bran and aleurone, and through the phenomena of osmosis to introduce the bases into the cytoplasm of the inner cells where the chemicals can act upon the materials which produce rancidity. The lignine, with the pectic materials and the cutine, which encloses the cellulosic elements of the fibers are thereby dissolved. It is to be noted that the dissolving of these materials could not be effected by water or steam under pressure or other methods used heretofore in processing rice. The mineral silicates and carbonates which are generally the magnesium, potassium, calcium or iron salts in the hulls and bran are hydrolized and dissolved, thus producing paths through the cellulosic and albumenoid membranes for the basic solution to enter and react with the colloidal solution of the oils, fats, proteins and lipoids present in the protoplasm of the cells of the embryo and of the pericarpe of the kernel. This double reaction is made possible by the use of the mixture of sodium hydroxide and sodium carbonate set forth above. This reaction is preferably carried out under vacuum from between 10 inches and 28 inches and from room temperature up to the boiling point of the solvent under the pressure conditions present. The extracting effect increases as the temperature increases. By increasing the concentration of the chemicals one can accomplish the extraction of oil, wax, vitamins and similar products which will pass from the cells of the kernels into the basic solution.

The complete extraction of fats and oils from the grains is possible also by using preferably a chlorinated solvent such as trichlorethylene in quantities of from a minimum of 100 pounds for 100 pounds of material to be extracted upwardly before the application of the basic treatment. The reaction is preferably carried out under high vacuum and at a temperature up to about 135° Fahrenheit.

The treatment with the basic solution can also be carried out at elevated pressures from about 30 pounds per square inch to 100 pounds per square inch, the preferred pressure being about 50 pounds per square inch. In this case the temperature should be about 150° to 190° Fahrenheit, the lower temperature being utilized at the higher pressures and the higher temperature at the lower pressures. The time required for the reaction under these conditions is about 20 minutes, the time required being longer at lower temperatures and pressures and shorter at higher temperatures and pressures. It is also possible to carry out the reaction at atmospheric pressure in which case it has to be carried out at about the boiling point of water. More specifically, the reaction is preferably carried out at 210° Fahrenheit for about 30 minutes.

As pointed out above the preferred method is to utilize vacuum, this method possessing certain important advantages. More specifically, the vacuum tends to pull air out of the interstices between the hulls and the pericarpe, the solution taking its place and reacting upon the constituents of the hulls both from the inside and the outside, thus making possible the initiation of osmosis through the cells of the pericarpe where the chemicals exert a hydrolytic and solubilizing action on all the elements of the protoplasm of the living cells. This same action takes place to a lesser extent under atmospheric pressure. In the case of positive pressure, the salts are forced through the cellular interstices of the hulls and the pericarpe and the phenomena of osmosis, although taking place may be somewhat disturbed.

The second step of this process is performed by replacing the weak alkaline solution by a slightly acidic solution in order to perform the hydration necessary to initiate the subsequent reactions by which the valuable components of the kernels are stabilized and are made further capable of being transported as far as possible into the inner cells of the kernel. The rice after the first step can be removed from the alkaline solution and then placed in the weak acidic solution or a sufficient quantity of acid can be added to neutralize the alkaline solution and make the resulting solution acid. Suitable acids are the inorganic acids such as hydrochloric, sulfuric or nitric or certain of the stronger organic acids such as acetic, citric and the like. The hydrolysis step is preferably carried out under pressure, the pressure being from about 10 lbs. per square inch up to about 100 lbs. per square inch or higher. The temperature is maintained at from room temperature to about 190° Fahrenheit. Treatment with the acid solution is carried on for a time which may be as little as 5 minutes or as much as 35 minutes after which the grains or kernels are withdrawn and sent to the drier. After the grain is dried, it can then be milled and further processed to provide final rice products. Instead of drying the grain, the rice can be left in contact with the solution at the same temperature and pressure until gelatinization of the endosperm is completed, thus obtaining the parboiled or converted rice.

The third step of this process is an oxidation to improve the color of the product. This step can be carried out simultaneously with the hydration step, but it is preferred to perform it after the drying of the rice. If the initial starting product was rough rice, the oxidation step is carried out after the rice has been hulled and preferably after the first break. The purpose of the oxidation steps is to give the rice kernels a whiter color by oxidizing the colored elements of the bran and removing the dissolved lignine, pectone and cutine and similar other materials from the outside rice cells. This oxidation can be performed with any oxidizing agent capable of quick and total disintegration without leaving any undesirable residue. Preferred oxidizing agents are hydrogen peroxide such as a 35 percent solution under water sold under the trade-name of "Albone 35" or sodium chlorite. The reaction is preferably carried out at a low temperature and in any event not over 160° Fahrenheit. More specifically, the rice kernels are sprinkled or bathed in a solution of water having ½ pound to 10 pounds of "Albone 35" dissolved in 100 pounds or more of water for each 1,000 pounds of rice to be treated. The temperature is preferably between 130° and 150° Fahrenheit. The solution is kept in contact with the kernels for about 4 or 5 minutes. A preferred method of introducing the oxidizing solution is to spray it on the rice while the rice is in a spiral conveyor thereby thoroughly mixing the rice and oxidizing solution. The rice is then washed with water in a temperature of about 130° Fahrenheit and dried at a low temperature, for instance, from 60° to 90° Fahrenheit and preferably in the vacuum to stabilize the moisture content at about 12 percent. After this treatment the product may be quickly washed with acidified water. The acids used for this acidification step can be those used above in the hydration step.

The fourth and last step of the present process is a rapid drying raw rice following which the product is graded and packed. This is made possible by the fact that the product is white and appears to be of the same quality as rice put through the ordinary series of breaks and polishing operations.

The above process can be applied to the treatment of rough rice, brown rice, or first break rice to obtain precooked rice. If the rice is to be canned, the canning is performed at the step of hydrolysis and the precooking is done inside of the cans which already contain the necessary quantity of solution of oxidizing agents. In the case of dry precooked rice, the precooking is done in the hydrolyzing and oxidizing solution; then the rice is dried and put in cartons or boxes.

When rough rice is milled in the usual manner, the products obtained from the kernel or hulls are bran stone, some germ, and brown rice or loonzain. The loonzain is subjected to a first break from which another bran product is obtained containing substantially all the germ or embryo of the kernels. These two products, namely, the hulls and the bran, can be subjected to the present process. When the hulls are subjected to the present process, the products derived are white holo-cellulose and a gel, the gel consisting of various silicates, pectones, lignine, fats, waxes, starch and certain other materials in small quantities. All of these products are useful and are very resistant to the formation of rancidity. The cellulose is of the highly purified form and can be used in most cellulose applications. The gel is a white creamy mass and is useful in cosmetics.

The bran when subjected to the present process provides rice oil, waxes, vitamins, and minute quantities of other materials as well as bran feeds. All of these products are stabilized, that is, they will not become rancid upon storage. In addition, there is obtained a new product which includes enzymes and lipoids. The principal enzyme in this new product appears to be diastase.

In the treatment of the hulls the alkaline solution is somewhat more concentrated in that it is used in treating the rice, the concentration being from 0.1 percent up to 6 percent or more. The oxidizing step follows the hydrolysis step and is in turn followed by hydration of the cellulose and its liquor which yields the gel mentioned above. This gel is a new product and is useful in application such as in cosmetics.

The bran with the germ can also be subjected to the same treatment set forth in the above process but the alkaline solution must be more concentrated, for example, from 2 percent to 6 percent by weight or more, so as to obtain the extraction of sulphurized oils and waxes and the vitamins which are contained therein. The extracted bran, when neutralized after the hydrolysis steps constitutes a first grade feed. The hydrolysis of oils, followed by the oxidation and a washing with water, produces a separation of the wax from a clear white colored oil and the new product which contains the enzymes and lipoids described above. This new product is highly anti-oxidant and stable upon storage.

Instead of using the process set forth in the preceding paragraph, the bran can be extracted with a chlorinated solvent, such as trichlorethylene by which only the oils and waxes are extracted. Then the bran can be subjected to the above described process, that is, subjected to an alkaline solution containing between 1 and 2 percent of alkali by weight, followed by hydration. This procedure separates the vitamins, the product being finally neutralized. The oils and waxes extracted by the chlorinated solvent are also treated with an alkaline solution containing from 3 to 9 percent of alkali by weight, then hydrated with a solution containing 1 to 3 percent by weight of hydrochloric acid or some equivalent acid, and then oxidized with suitable agents such as "Albone 35." The product is finally washed and decanted from the water as described above.

It is believed that the following is an explanation of the manner in which the above described process operates to prevent the development of rancidity in products treated by this process. This explanation is given by way of illustration and is not to be considered as a limitation on the scope of the process. The oils and fats contained in the bran and in the germ of the rice or extracted from it can become rancid by absorbing oxygen, thereby increasing the peroxide value and yet be sweet by organoleptic test but rancid if undergoing a chemical test. It is generally admitted in the rice trade that rice is rancid when it smells bad; and yet even if rice is not by organoleptic test rancid it is technically rancid when its peroxide value is up over a certain figure. This technical rancidity is the precursor of the organoleptic rancidity. In the rice, rancidity is the formation of simple bodies from more complex molecules of its fats elements and the exact nature of the reaction is dependent on the conditions under which it occurs. This rancidity generally is oxidative, hydrolytic, and ketonic in the rice and its products. By oxidation the oxygen attacks the double bond and forms some kind of oxide. In the rice oil the mechanism of rancidification is based on the fact that nascent hydrogen is liberated and unites with molecular oxygen to form loosely combined or nascent hydrogen peroxide. This unstable peroxide adds to the unsaturated bond of the triglyceride to form a glyceride peroxide which in turn splits into aldehydes and forms the rancid compound. The oleic acid which is the highest component of the oil contained in the rice adds molecular oxygen directly forming a peroxide, water splits off leaving an oxide. Further addition of oxydation causes the oleic acid to split into $CO_2$ gas, heptylic aldehyde, and epihydrin aldehyde. But the composition of fats and oil in rice has a good deal of influence in decreasing the degree of oxidation, and even annulling it. In fact the oleic acid is accompanied with a good amount of linoleic acid (about 34%), and linolenic acid, these two acids having respectively two double bonds and three double bonds. Regardless of the end products or the nature of the reactions at the double bond, only 15 to 30 percent of the double bonds of fats contained in rice are changed by oxidative rancidity and this change can be controlled by the antioxidant elements present in the cells of the kernel or in the globules of rice oil. In fact by saponification the oleic acid is removed from the rice very easily by the treating solvent used in my process while the linoleic and linolenic acids are much more resistant to this action and thus remain in the kernels in greater proportional quantity than the oleic acid.

Other factors facilitating rancidity of rice and rice oil are metals, moisture and light. Effectively they are a group of catalysts to rancidity, but light and moisture act as accelerator to rancidity. They are not the starter of the reaction but both make it go faster once it is started, as follows:

Fat or oil plus oxygen plus water yields complex. Complex yields ketones plus aldehydes plus polymerized residues plus gases, etc.

The oil and fat contained in rice have a certain induction period due to a low peroxide value. This peroxide value is generally gradually increased to 50 or so before rancidity is detected. If an element of the rice or rice oil (whether it is in its natural form or produced by reaction inside the cells of the kernel) has any antioxidant value, in will act to prevent rancidity. Even if the grains or their oil and fat will be exposed to the air, this antioxidant either prevents the oxygen from being absorbed or it will take up the oxygen by itself. There are some antioxidants that act sometimes as a positive or negative catalyst causing some action to take place other than the one ordinarily involving the fatty materials. Since oxidation in rice or its oils is a series of minor reactions, its natural antioxidants, if preserved or increased in the kernel, most of the time act to stop this change, or to prevent the recurrence of the complex chain reaction. The oils and fats of rice have effectively some natural antioxidants and they possess a hydroxyl group with which antioxidant activity is eminently tied up. These natural antioxidants outside of the linoleic acid, lecithine, and cholesterine, are the tocopherols. Their stabilization, together with the water soluble soaps, the citric acids, or sodium citrate, etc., that can be introduced or created by chemical reaction within the grains through this process, are of the highest importance for the prevention of rancidity in rice and its marketable products.

It is a known fact that the rice is a grain in which the albumen is constituted by dead cells filled with amidon. But the parts of the pericarpe of the grain are formed of living cells, which under proper conditions engender a great proportion of amylase, most of all in the layer surrounding the endosperm. The reserves contained in rice grains, proceeding from the endosperm to the outer part of the kernels, are the amidon, the proteic substances, the oils and fat, minerals, and cellulose. All those elements constitute the principal reserves which are chemically transformed into elements susceptible to be transferred from one cell to the other in order to be assimilated during the process of germination. This transformation and emigration of elements is made possible by a change of osmotic tension, together with the diluted solutions which are supplied to the germinating grain by the soil.

In order to obtain with my process the prevention of rancidity, as well as the preservation of the materials provided with high food value, it has been necessary to act upon the grains in such a way as to produce or facilitate a physical action of osmosis through the utilization of hypotonic solutions in relation to the cellular elements of the kernels. An osmotic current is then established going from the hypotonic solution toward the hypertonic one, contained in the cytoplasm of the rice cells through their permeable walls and through the albumenoid membranes in spite of their difficult penetrability, especially by solutions of mineral salts or dissolved saline substances.

In order to complete the chemical reactions within the rice cells and allow the mineral substances, together with crystalloid solutions, to go through those albumenoid membranes in force of the osmotic phenomenon, it has been found necessary that the solution used contain diluted chemicals able to react first on the elements of those membranes, transforming them into permeable substances. In other words, it has been necessary to combine the provocation of a simple physical phenomenon of osmosis together with that of a chemical phenomenon of multi-reactions such as saponification and hydrolization.

It is evident that when the rice, be it hulled or un-hulled, is put in contact with the diluted solutions preferably exposed to a certain temperature in vacuum, the chemical elements of the solution react first from the exterior to the interior of the cells, opening the way toward the inner cells of the bran, up to the aleurone. While this passage of the solution is effected, the cytoplasm contents become less and less concentrated, and end to become hypotonic in relation to the contents of the nearby living cells. At this moment it is itself drawn by those nearby cells the contents of which is progressively diminishing in concentration, so that at a certain moment, they become hypotonic in respect to the adjacent deeper cells. An osmotic passage is established therefore progressively, between the nearby cells up to the deepest cells of the bran and the aleurone, and even to the outer cell of the endosperm. However, the cellular solution of the outer cell of the different layers of the grain becomes finally hypertonic in relation to the outer solution and again absorbs it.

It is evident that by this process if the solution has a strong concentration and therefore is hypertonic in respect to the solution within the cells of the grain, the content of the cytoplasm of the grain will be extracted and pass in the outer solution.

When the reactions are ended and the concentration within the cells has reached the highest degree so that the mineral substances contained in the treating solution will not be used anymore by the elements of the cytoplasm, we reach the osmotic equilibrium between the contents of the cells of the outer layers of the grain and the solution. At this point the process of stabilization is completed.

An important feature of this process is that of accomplishing it by treating the rice (rough or hulled at any stage) chemically, physically, and mechanically, preferably in continuous process in order to obtain finished products resistant to formation of rancidity, whitened, and containing all the valuable elements that the grain naturally possesses, but stabilized. Therefore, although it is not confined to directly starting from the rough rice, all the conventional products in the market can be obtained by this method. In fact, the invention has particular applicability in the treatment of rough rice in that there will be obtained the following products: whole raw rice stabilized against deterioration and rancidity, whitened, parboiled, or precooked; hulls and bran, from which can be obtained respectively cellulose, gel, and penthosanes; oils, fats, and vitamins.

To better illustrate the nature and objects of this invention the following examples have been given. Although these specific examples have been given for the purposes of illustration, it is to be understood that these examples are not to be construed as a limitation of the present process.

EXAMPLE I

First operation 100 barrels of rough rice, equal to 16,620 pounds are introduced simultaneously and as rapidly as possible in a steeper or any boiler together with a solution equal in quantity to 20 gallons per barrel of rough rice. The solution contains 3.3 pounds of sodium hydroxide and 2.5 pounds of sodium carbonate. The solution is preferably at an elevated temperature of 200° Fahrenheit. The introduction of the rice and the solution is regulated so as to have the introduction of these materials end at the same time.

Vacuum is then applied, 10 inches of vacuum being utilized for purposes of this illustration, and the temperature stabilized at 158° Fahrenheit. The rice is treated in this manner for 10 minutes.

Second operation

The hydrating step is carried out in the same vessel by adding to the mixture of rice and solution 6 pounds of concentrated hydrochloric acid. Immediately after the addition of the acid, the vacuum is destroyed and a positive pressure of 60 pounds per square inch is admitted into the vessel. The hydrating step is completed after 15 minutes.

Third operation

The rice is then dumped and removed from the solution. After being dried to a moisture content of 11 to 12 percent, the rough rice is passed through the conventional stone mill where it is hulled yielding two products, namely, hulls and brown rice. The brown rice is subjected to the first break in the usual manner.

Fourth operation

The rice product from the first break is sprinkled or bathed by a solution of "Albone 35" which is a concentrated solution of hydrogen peroxide. One pound of the "Albone 35" is used for each 1,000 pounds of rice, the "Albone 35" being dissolved in 100 pounds of water. The oxidizing agent is added to the rice while the rice is in a spiral conveyor, the solution being kept in contact with the rice for 4 to 5 minutes. The rice after treatment with the oxidizing agent is washed with water at 130° Fahrenheit and dried under vacuum at 90° Fahrenheit to a moisture content of 12 percent.

There is set forth below a table showing the amounts of the various products obtained from one barrel, 162 pounds, of rough rice using the conventional milling processes of the present invention. These figures have been incorporated in one table so that the two processes can be conveniently compared. These figures are given for purposes of illustration and not as a limitation.

|  | Milling, lbs. | Process of the Invention, lbs. |
| --- | --- | --- |
| Foreign Materials | 1.62 | 1.46 |
| Hulls | 32.00 | 29.30 |
| Bran | 15.62 | 5.82 |
| Broken Grains | 27.65 | 2.24 |
| Fancy Head | 85.11 | 123.18 |
| Total | 162.00 | 162.00 |

The figures given above are for a parboiled product made according to the conventional milling process and the process of the present invention, respectively. The term "fancy head" designates whole unbroken rice having good appearance and color.

The above fancy head products from both processes were analyzed. These analyses are set forth below for the purposes of comparison.

|  | Milling, percent | Present Process, percent |
| --- | --- | --- |
| Moisture | 12.3 | 12.85 |
| Protein | 8.0 | 8.63 |
| Fats | .3 | 2.95 |
| Carbohydrates | 79.0 | 73.62 |
| Ash | 0.4 | 1.30 |
| Crude Fiber |  | 0.65 |
| Total | 100.0 | 100.0 |

Analysis showed that the product from the present process was extremely rich in minerals and vitamins whereas only traces of these elements were found in the product from the conventional milling process. Below is given a table showing a typical analysis of the minerals and vitamins in the product made according to the process of this invention.

| | |
|---|---|
| Iron | 0.06 of ash. |
| Calcium | 12.26 of ash. |
| Phosphorus | 17.95 of ash. |
| Potassium | 8.43 of ash. |
| Magnesium | 8.97 of ash. |
| Invert sugar as maltose | 0.20. |
| Invertible as sucrose | 4.40. |
| Thiamine | 2,210. |
| Riboflavin | 1,100. |
| Niacin | 12,100. |
| Vitamin E | 615. |

The thiamine, riboflavin and niacin are reported in micrograms per pound and the vitamin E in gamma per pound.

From the above tables it will be seen that not only is a greater quantity of "fancy head" product obtained using the present process but that this product is very rich in minerals and vitamins. The increased amount of fancy head product results from the fact that fewer mechanical milling operations need be utilized to obtain the finished product and the increased mineral and vitamin content is a result of including a large portion of the bran in the final product. This is made possible by use of the oxidizing step of the process.

The present product is particularly adapted to producing "parboiled" or "converted" rice products. In case a converted product is to be made, the rice is kept in contact with the neutral or slightly acid solution used in the hydration step, the temperature and pressure being kept constant in order to complete the hydration through the endosperm and to gelatinize its contents. This will take an additional 30 minutes or more. Then the solution is withdrawn and the rough rice sent to be dried to 12 percent moisture content after which it is passed to the huller, then the first break, and eventually treated as above with an oxidizing solution followed by neutralization. The product so obtained is much more satisfactory, more pleasing to the eye, contains more valuable food elements, has a high degree of resistance to rancidity, the yield is increased and the production expenses are lowered.

The following example is given to illustrate the use of my process to obtain from rough rice parboiled or converted rice using a different sequence of operations. The rough rice is hulled in the normal and conventional way and the hulled rice is subjected to the first break. From the first break the rice is conveyed to a vessel provided with attachments to produce vacuum, pressure, heating and steaming, and a circulating water system or rotating system.

The rice is introduced into the vessel with a water solution containing 1½ pounds of caustic soda and 1 pound of sodium carbonate for 100 barrels of rice, the solution being diluted so that there are not over 20 gallons of solution per barrel. The temperature of the solution is as introduced about 200° Fahrenheit. The minimum amount of liquid that can be used is the exact quantity necessary to increase the moisture quantity of the rice up to about 36 percent. A vacuum of 10 inches is then created within the vessel and the treatment is continued for 3 minutes with agitation. A concentrated solution of 2½ pounds of hydrochloric acid is then introduced. After introduction of the acid the vacuum is destroyed and is replaced by a positive pressure of from 25 pounds per square inch to 80 pounds per square inch, the temperature being between 140° and 160° Fahrenheit. This treatment is continued for 5 minutes. The rice product can now be withdrawn and subjected to the oxidizing solution in the manner described above.

If, however, the product wanted is parboiled or converted rice, the steeping in the slightly acid solution is continued at the above elevated temperature and pressure with agitation for a minimum of 25 minutes. After this treatment, the gelatinization of the endosperm and of the grain should be complete. At this point the solution is withdrawn together with the grain, the grain being separated from the solution by a special screen. The grain is then sprinkled or bathed in a diluted solution of "Albone 35" or any other oxidizing agent, dripped and sent to a dryer, where it is subjected to the action of live steam 2 to 5 minutes. It is then dried at around 140° Fahrenheit and preferably in a vacuum to a stabilized moisture content of 12 percent.

Inasmuch as a large proportion of the minerals, vitamins, and other valuable food products are contained in the bran, it is preferable to produce a new rice product beginning with rough rice and passing the rough rice through a conventional stone huller. The hulled rice could then be treated by increasing proportionately the concentration of the chemicals used. Thus all of the natural nutritive elements of the hulled rice would be contained in the marketable product which would still possess a high resistance to rancidity and would have a white color. Such a product is unobtainable by the methods used in the rice industry today.

Although rice has been used as an illustration in the above examples, it is to be understood that other cereals can be treated by the present process. Certain examples and illustrations have been given but it is to be understood that the process is capable of various changes and modifications without departing from the spirit and the scope of the invention. Accordingly, the invention is to be limited only as set forth in the following claims.

I claim:

1. The process of treating rough rice, comprising treating the rough rice with a basic solution to produce a penetration of the basic solution into the inner cells of the rice kernel, treating the resultant product with an acidic solution, removing the product from the acidic solution, hulling the rough rice to produce brown rice, subjecting the brown rice to a first break, and thereafter treating the product from the first break with an oxidizing solution.

2. The process of treating rough rice, comprising treating the rough rice with an alkaline solution at an elevated temperature and at a reduced pressure to produce a penetration of the alkaline solution into the inner cells of the rice kernel, treating the product thus obtained with an acidic solution at elevated temperature, removing the product from the acidic solution, hulling the rough rice to produce brown rice, subjecting the brown rice to a first break, and thereafter treating the product from the first break with an oxidizing solution to improve the color thereof.

3. The process of producing converted rice from rough rice, comprising treating the rough rice with a basic solution to produce a penetration of the basic solution into the inner cells of the rice kernel, treating the resultant product with an acidic solution at elevated temperatures to gelatinize the endosperm and the grain, removing the product from the acidic solution, hulling the rough rice to produce brown rice, subjecting the brown rice to the first break, and thereafter treating the product from the first break with an oxidizing solution.

4. The process of treating rice to improve the storage properties thereof, comprising treating the rice with an aqueous solution including an alkaline hydroxide and an alkaline carbonate, and thereafter removing the treated rice from the treating solution.

5. The process of treating rice to improve the storage properties thereof, comprising treating the rice at an elevated temperature with an aqueous solution including an alkaline hydroxide and an alkaline carbonate, thereafter treating the rice with a slightly acidic solution, and then removing the treated rice from the acidic solution.

6. The process of treating rough rice, comprising treating the rice at an elevated temperature and at a pressure lower than atmospheric pressure with an aqueous solution including an alkaline hydroxide and an alkaline carbonate, thereafter treating the rice with a slightly acidic aqueous solution, hulling the rough rice to produce brown rice, subjecting the brown rice to a first break, and then treating the product from the first break with an oxidizing agent, the oxidizing agent being such that during treatment of the rice all of the oxidizing agent is converted to a non-toxic food product.

7. A rice product substantially free of materials tending to produce rancidity and formed by treating rough rice with a basic solution, treating the resultant product with an acidic solution, removing the product from the acidic solution, hulling the rough rice to produce brown rice, subjecting the brown rice to a first break, and thereafter treating the product from the first break with an oxidizing solution.

8. A converted rice product substantially free of materials tending to produce rancidity and produced by treating rough rice with a basic solution, treating the resultant product with an acidic solution at elevated temperatures until the rice is gelatinized, hulling the rough rice to produce brown rice, subjecting the brown rice to a first break, and thereafter treating the product from the first break with an oxidizing solution.

9. The process of treating rice hulls, comprising treating the hulls with an alkaline solution and then an oxidizing agent to produce cellulose and a gel.

10. The process of treating bran derived from rice hulls, comprising treating the bran with an alkaline solution, and then neutralizing the solution to produce an oil, waxes, vitamins, and a mixture of enzymes and lipoids.

11. The process of treating rough rice, comprising treating the rough rice with an alkaline solution at an elevated temperature and at a reduced pressure to produce a penetration of the alkaline solution into the inner cells of the rice kernel, treating the product thus obtained with an acidic solution at an elevated temperature and at an elevated pressure, removing the product from the acidic solution, hulling the rough rice to produce brown rice, subjecting the brown rice to a first break and thereafter treating the product from the first break with an oxidizing solution to improve the color thereof.

12. The process of producing converted rice from rough rice, comprising treating the rough rice with a basic solution to produce a penetration of the basic solution into the inner cells of the rice kernel, treating the resultant product with an acidic solution at an elevated temperature and at an elevated pressure to gelatinize the endosperm and the grain, removing the product from the acidic solution, hulling the rough rice to produce brown rice, subjecting the brown rice to the first break, and thereafter treating the product from the first break with an oxidizing solution.

References Cited in the file of this patent

UNITED STATES PATENTS

| | | |
|---|---|---|
| 1,265,700 | Von Hagen | May 7, 1918 |
| 1,281,828 | Pierson | Oct. 15, 1918 |
| 1,987,304 | Menke | Jan. 8, 1935 |
| 2,007,693 | Ruter et al. | July 9, 1935 |
| 2,530,272 | Thrasher | Nov. 14, 1950 |
| 2,538,007 | Kester | Jan. 16, 1951 |
| 2,555,235 | Huzenlaub | May 29, 1951 |

FOREIGN PATENTS

| | | |
|---|---|---|
| 3,032 | Great Britain | of 1862 |